(12) United States Patent
Silvia

(10) Patent No.: US 12,059,100 B1
(45) Date of Patent: Aug. 13, 2024

(54) COOKING TONGS WITH RETRACTABLE TEMPERATURE PROBE

(71) Applicant: T-CALC, LLC, O'Fallon, MO (US)

(72) Inventor: R. Anthony Silvia, O'Fallon, MO (US)

(73) Assignee: T-CALC, LLC, O'Fallon, MO (US)

( * ) Notice: Subject to any disclaimer, the term of this patent is extended or adjusted under 35 U.S.C. 154(b) by 0 days.

(21) Appl. No.: 18/622,090

(22) Filed: Mar. 29, 2024

Related U.S. Application Data

(60) Provisional application No. 63/456,174, filed on Mar. 31, 2023.

(51) Int. Cl.
*A47J 43/28* (2006.01)
*A47G 21/10* (2006.01)
*A47G 21/00* (2006.01)

(52) U.S. Cl.
CPC .......... *A47J 43/283* (2013.01); *A47G 21/10* (2013.01); *A47G 2021/008* (2013.01)

(58) Field of Classification Search
CPC ...... A47J 43/283; A47J 43/288; A47J 45/068; A47J 2202/00; A47G 21/10
USPC ............................................. 294/3, 10, 99.2
See application file for complete search history.

(56) References Cited

U.S. PATENT DOCUMENTS

| | | | |
|---|---|---|---|
| 495,158 A | 4/1893 | Lippy | |
| 4,580,909 A * | 4/1986 | McIntosh | A47J 43/283 374/E7.031 |
| 5,634,719 A | 6/1997 | La Neve | |
| 7,409,765 B2 | 8/2008 | So | |
| 8,746,765 B1 * | 6/2014 | Mafi | A47J 43/288 294/7 |
| 10,314,438 B2 | 6/2019 | Goldy | |
| 10,448,776 B2 | 10/2019 | Johncock et al. | |
| 10,620,055 B2 * | 4/2020 | Keller | G01K 13/00 |
| 2005/0201445 A1 * | 9/2005 | Harris, Jr. | G01K 13/00 374/208 |
| 2011/0044370 A1 | 2/2011 | Schochet et al. | |

FOREIGN PATENT DOCUMENTS

| | | | |
|---|---|---|---|
| CN | 201701093 U | | 1/2011 |
| CN | 104545296 A | | 4/2015 |
| KR | 20230029215 A | * | 3/2023 |
| TW | M495158 U | | 2/2015 |
| WO | 2017145113 A1 | | 8/2017 |

* cited by examiner

*Primary Examiner* — Dean J Kramer
(74) *Attorney, Agent, or Firm* — Grace J. Fishel

(57) ABSTRACT

Cooking tongs with first and second U-shaped arms hinged at a proximal end with generally flat and inwardly cupped spatulas at a distal end. A lance shaped temperature sensor mounted inside the first arm on a slide carrier and an aperture in the spatula through which a distal end of the lance shaped temperature sensor may be reciprocated on a slide carrier. A slide control attached to the slide carrier through a slot in a sidewall of the first arm for telescopic sliding of the lance shaped temperature sensor through the aperture in the first spatula. An electronic display window on the first arm connected to a data processor on the slide carrier for converting a signal received from the lance shaped temperature sensor into temperature data that is displayed in the electronic display window.

8 Claims, 6 Drawing Sheets

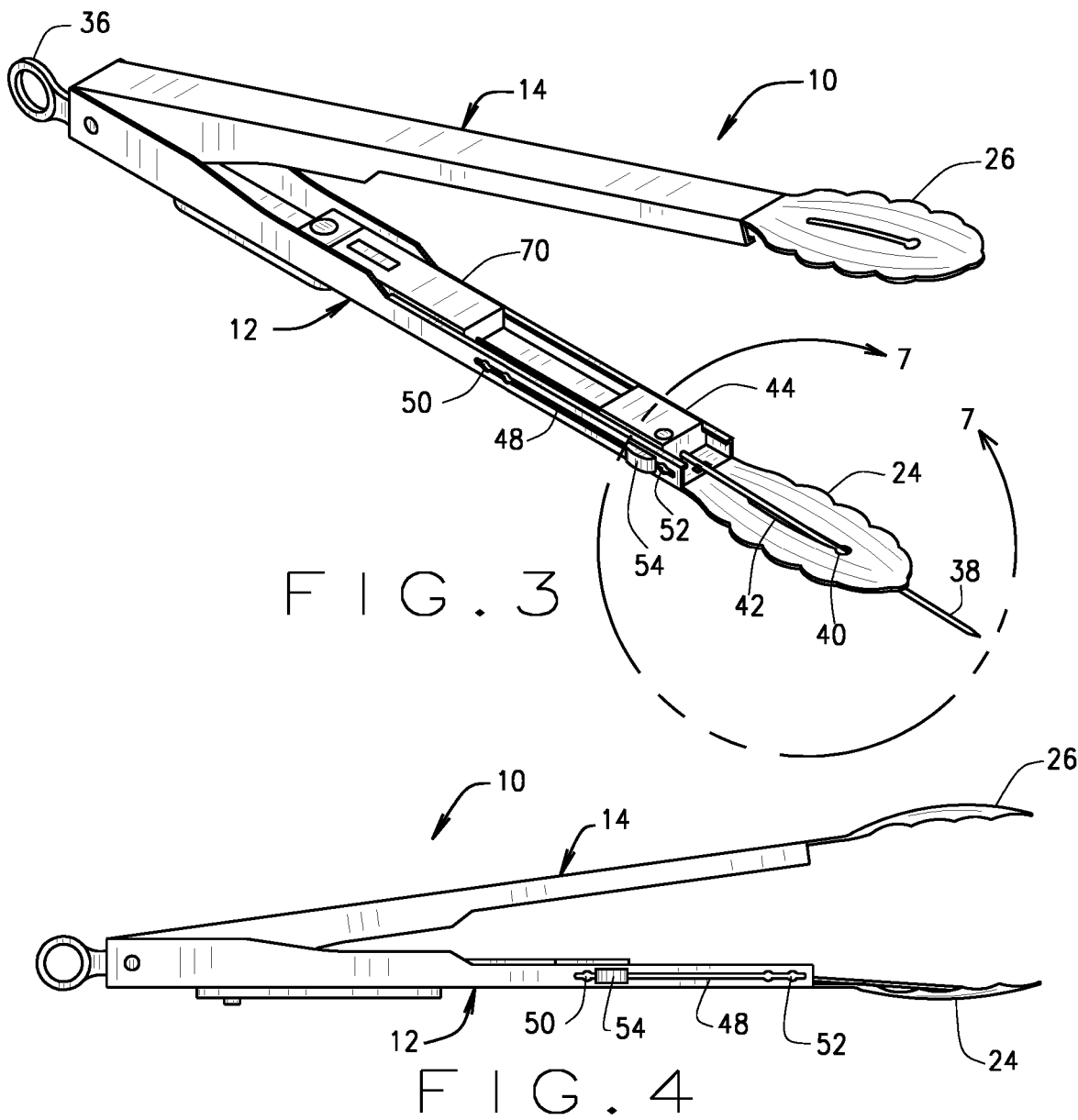
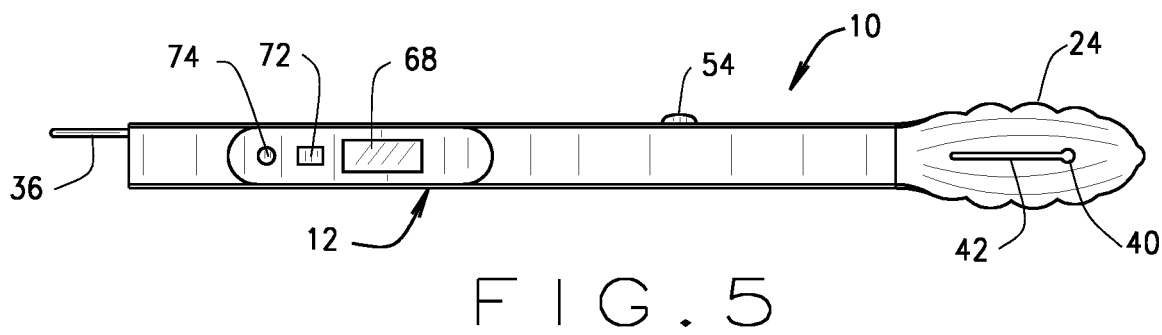

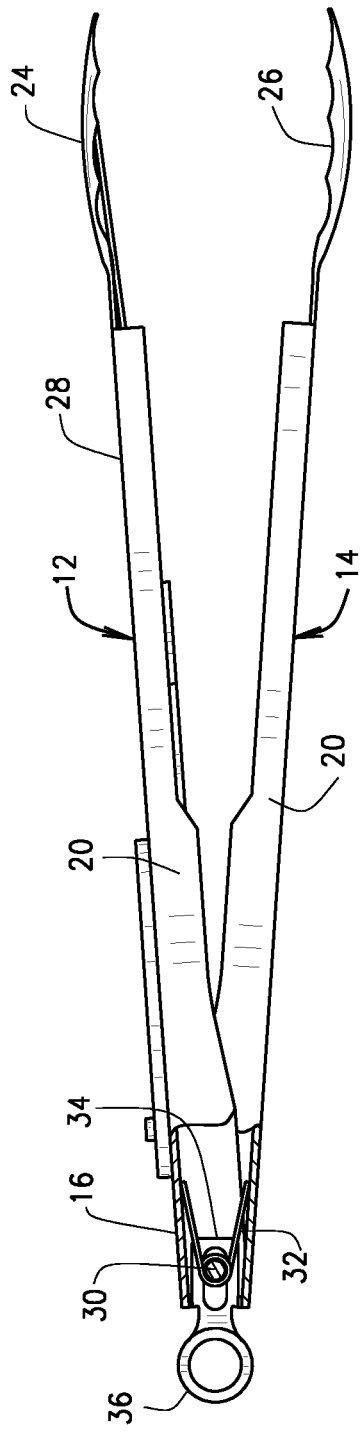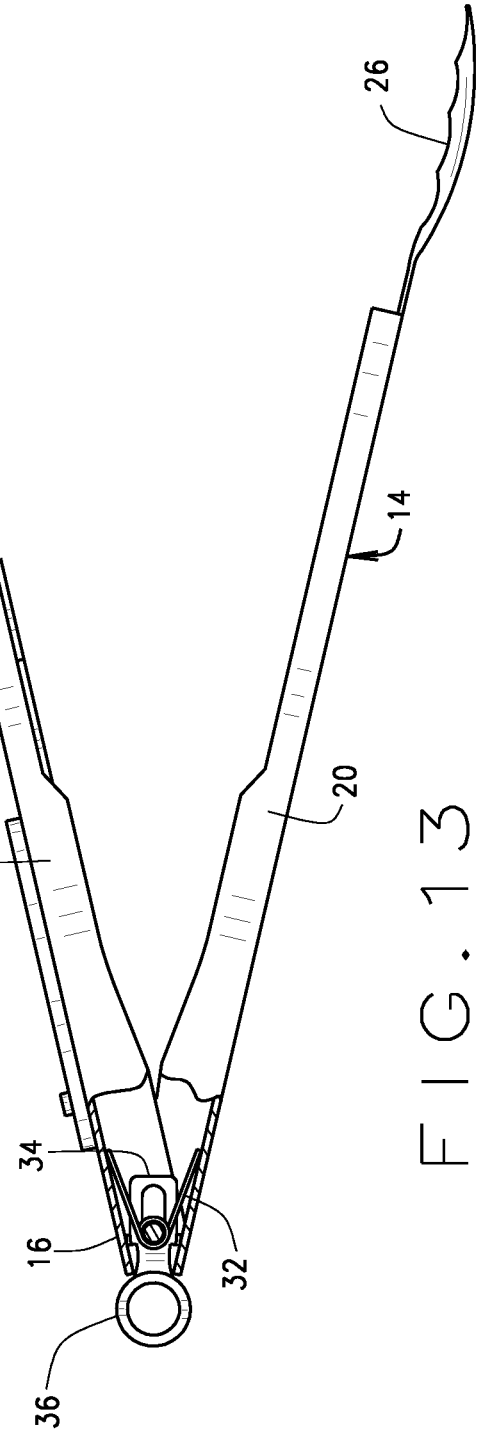

COOKING TONGS WITH RETRACTABLE TEMPERATURE PROBE

BACKGROUND OF THE INVENTION

Field of the Invention

The present invention relates to cooking tongs for use in manipulating food items during cooking and displaying the temperature.

Brief Description of the Prior Art

Temperature probes tend not to be combined with other cooking utensils. Tongs are commonly used for manipulating food items during cooking and there are lance shaped temperature sensors for inserting into the food during cooking but that requires two tools. Taking the temperature with a lance shaped temperature sensor requires the user to get quite close to the cooking surface and burns are not uncommon when the cooking is done on a barbecue grill.

BRIEF SUMMARY OF VARIOUS PREFERRED EMBODIMENTS OF THE INVENTION

This section provides a general summary of the disclosure, and is not a comprehensive disclosure of its full scope or all of its features.

In accordance with the various embodiments of the present invention, cooking tongs are shown with a first and second arm each of which has a proximal and a distal end. In all embodiments the arms are u-shaped with side flanges with inwardly turned ends and are attached to a spatula at the distal end. In most cases, the spatulas are generally flat and inwardly cupped, The arms are hinged at the proximal end with a torsion spring that is biased to hold the arms in an open configuration. As shown in the drawings, the torsion spring has a locking mechanism for selectively holding the arms in a closed configuration.

In another aspect, a lance shaped temperature sensor is mounted inside one of the arms with an aperture in the spatula through which a distal end of the lance shaped temperature sensor may be reciprocated with a slide control. The slide control for example may extend through a slot in a sidewall of the u-shaped arm for telescopic sliding of the lance shaped temperature sensor through the aperture in spatula.

In an implementation of the invention, an electronic display window for an electronic display is provided on the arm with the lance. The electronic display is connected to a data processor mounted inside the arm for converting a signal received from the lance shaped temperature sensor into temperature data that is displayed in the electronic display window.

BRIEF DESCRIPTION OF THE SEVERAL VIEWS OF THE DRAWINGS

In the accompanying drawings, in which one of various possible embodiments of the invention is illustrated, corresponding reference characters refer to corresponding parts throughout the several views of the drawings in which:

FIG. 3 is perspective view of the tongs similar to FIG. 1 but with the cooking probe extended;

FIG. 4 is a side view of the tongs as seen in FIG. 2;

FIG. 5 is a top view of the tongs as seen in FIG. 2;

FIG. 12 is a side view of the tongs in closed position partially broken away to show a spring; and, FIG. 13 is a side view of the tongs in open position partially broken away to show a spring.

DETAILED DESCRIPTION OF AT LEAST ONE PREFERRED EMBODIMENT OF THE INVENTION

Figure 1:
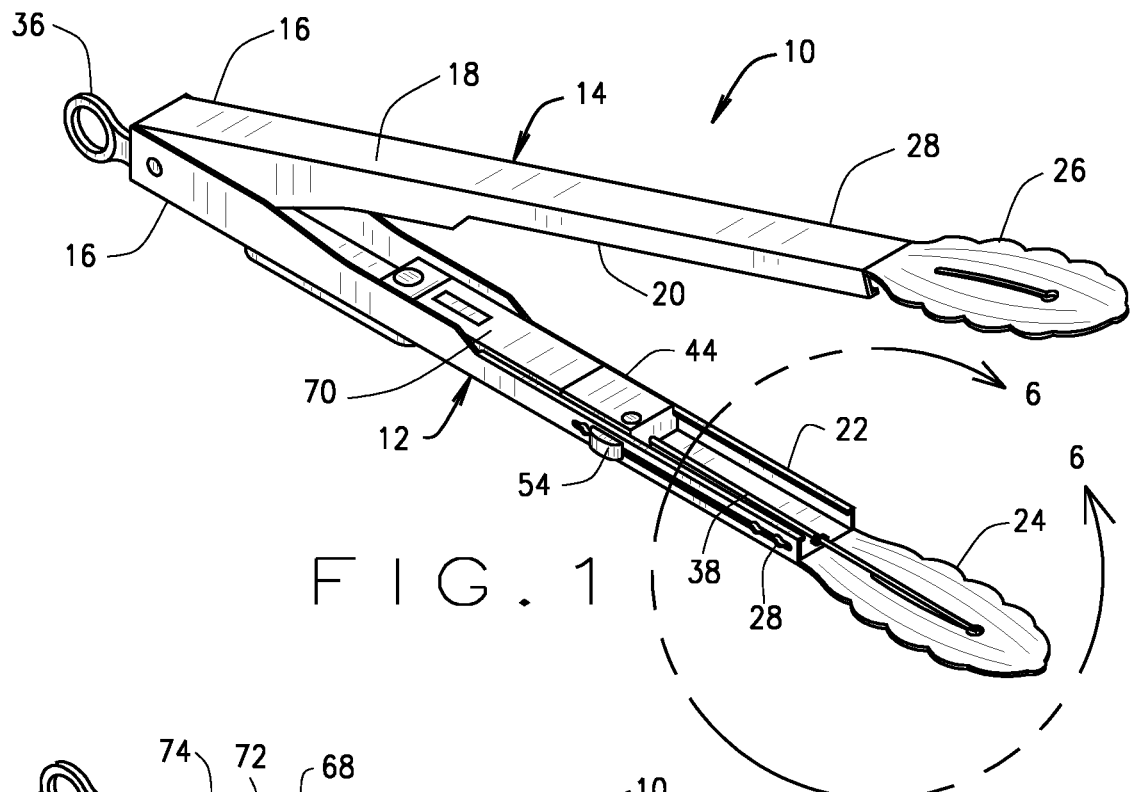
FIG. 1 is a perspective view of cooking tongs in accordance with the present invention in an open configuration as viewed from the side.
Figure 2:
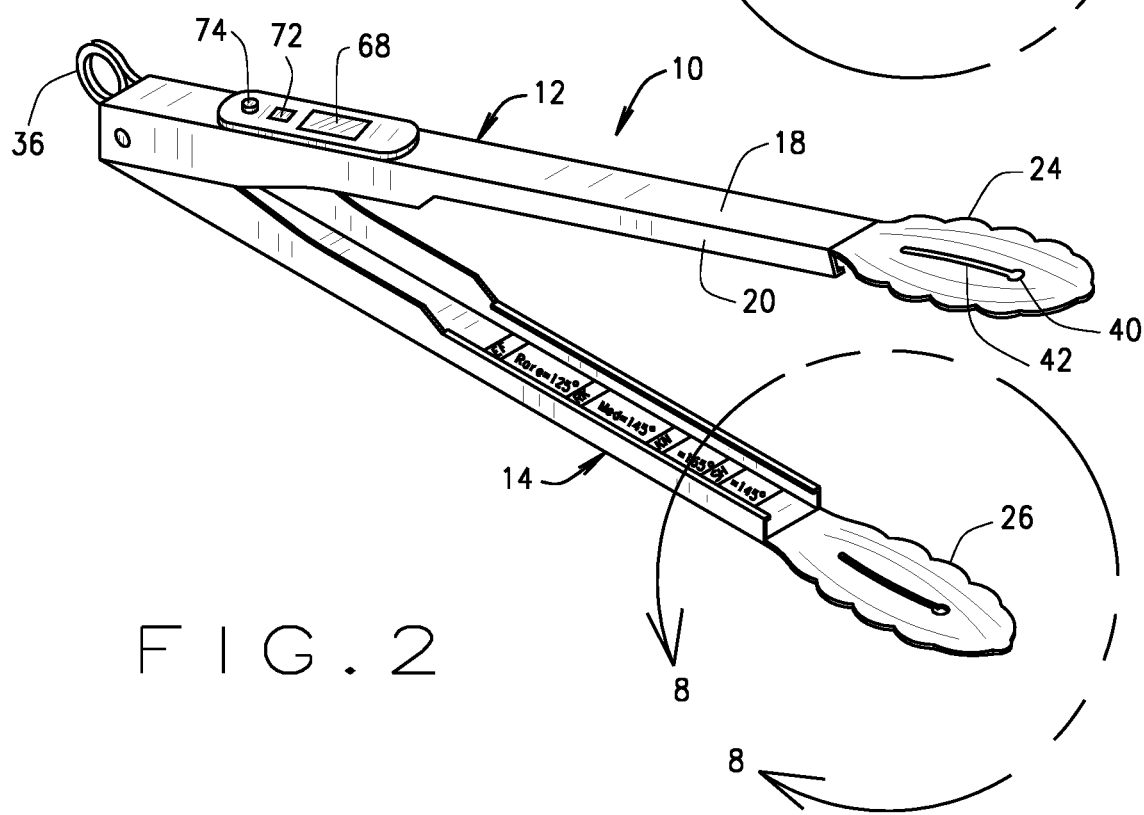
FIG. 2 is a second perspective view of the tongs turned over 180 degrees.
Figure 6:
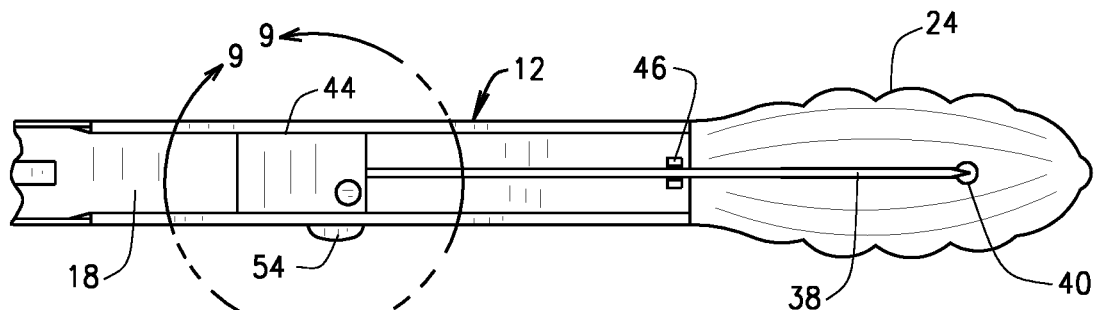
FIG. 6 is an enlarged detail taken along the line of 6-6 in FIG. 1.
Figure 7:
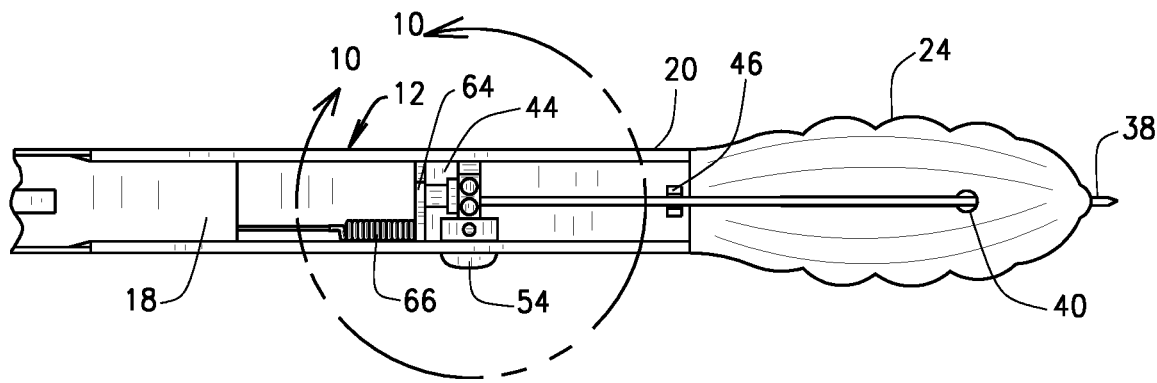
FIG. 7 is an enlarged detail taken along the line of 7-7 in FIG. 3.
Figure 8:
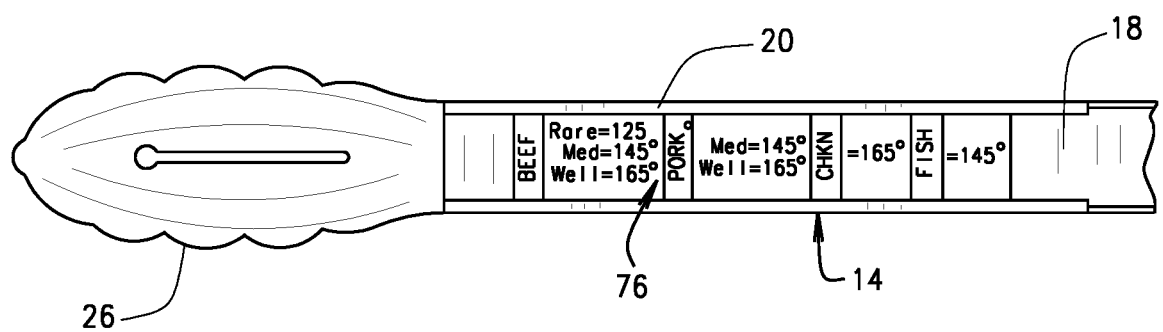
FIG. 8 is an enlarged detail taken along the line of 8-8 in FIG. 2

Referring to the drawings more particularly by reference character, cooking tongs 10 are formed with first and second arms 12, 14 with second arm 14 nested in first arm 12 at proximal end 16. Each of arms 12, 14 has a web 18 with side flanges 20 having inturned ends 22 forming a channel and a food handling inwardly curved spatula 24, 26, respectively, at a distal end 28. Although cooking tongs 10 are typically made of stainless steel, first and second spatulas 24, 26 may be coated with Teflon or some other food-handling approved plastic.

First and second arms 12, 14 are hinged at proximal ends 16 on a pivot pin 30 through aligned openings in side flanges 20. As shown in FIGS. 13, a torsion spring 32 biases first and second arms 12, 14 apart. As seen in FIG. 12 a locking member 34 slidable in the channel locks the arms in closed position. A hook 36 is attached to locking member 34 for sliding locking member 34 in the channel. Hook 36 may also be used for hanging tongs in a vertical position from a wall or rack.

Figure 11:
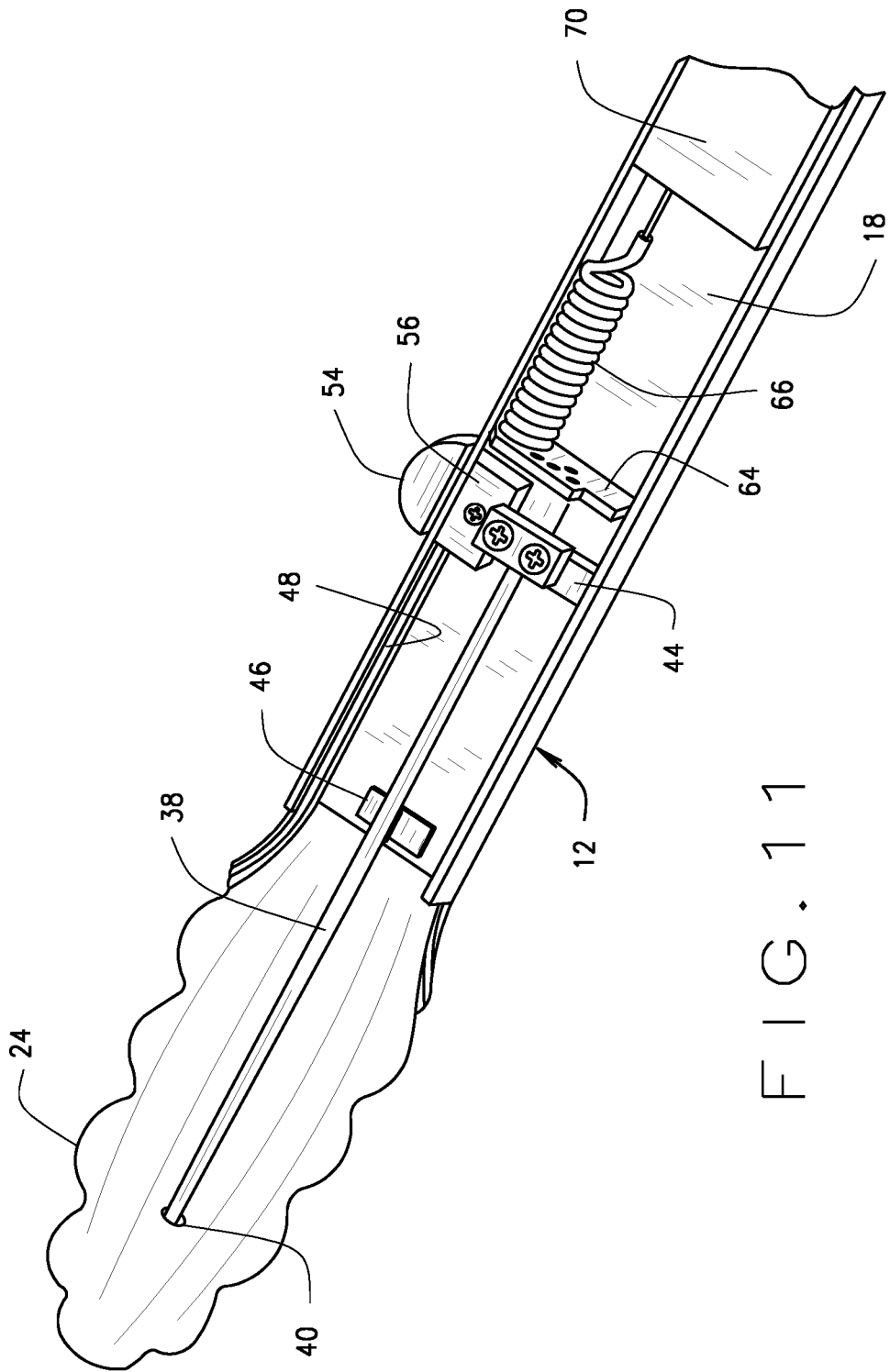
FIG. 11 is a an enlarged detail taken along the line of 11-11 in FIG. 7

A lance shaped temperature sensor 38 is mounted for longitudinal movement inside first arm 12 for reciprocal movement through an aperture 40 at the distal end of a longitudinal slot 42 provided in first spatula 24. Lance shaped temperature sensor 38 is mounted on a slide carrier in the channel formed by web 18, side flanges 20 and inturned ends of first arm 12. A guide 46 best seen in FIG. 11 is provided on web 18 for keeping the lance in alignment with aperture 40 for smooth operation.

Figure 9:
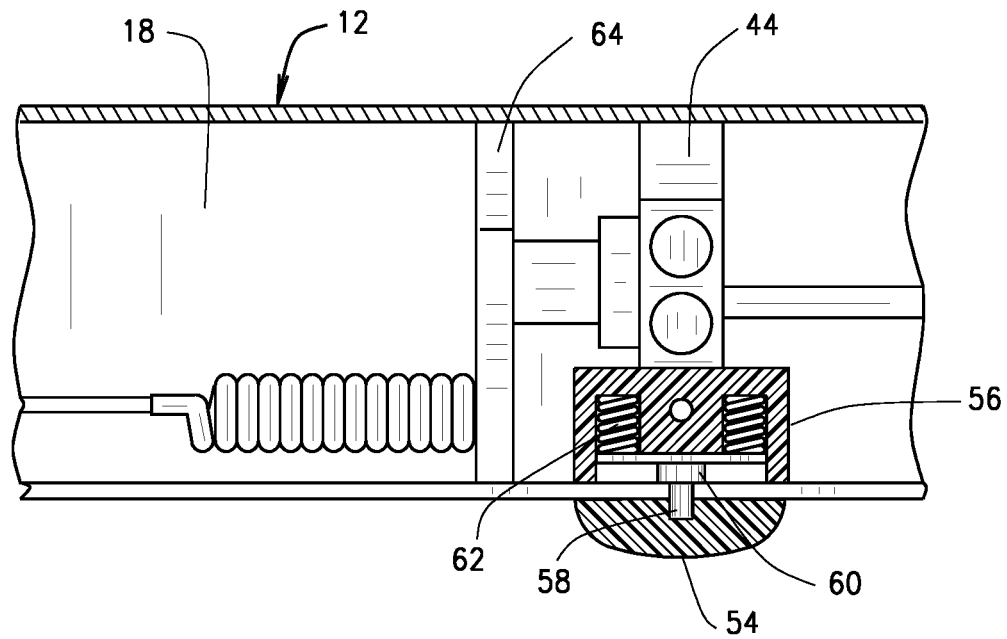
FIG. 9 is a further enlarged detail taken along the line of 9-9 in FIG. 6.
Figure 10:
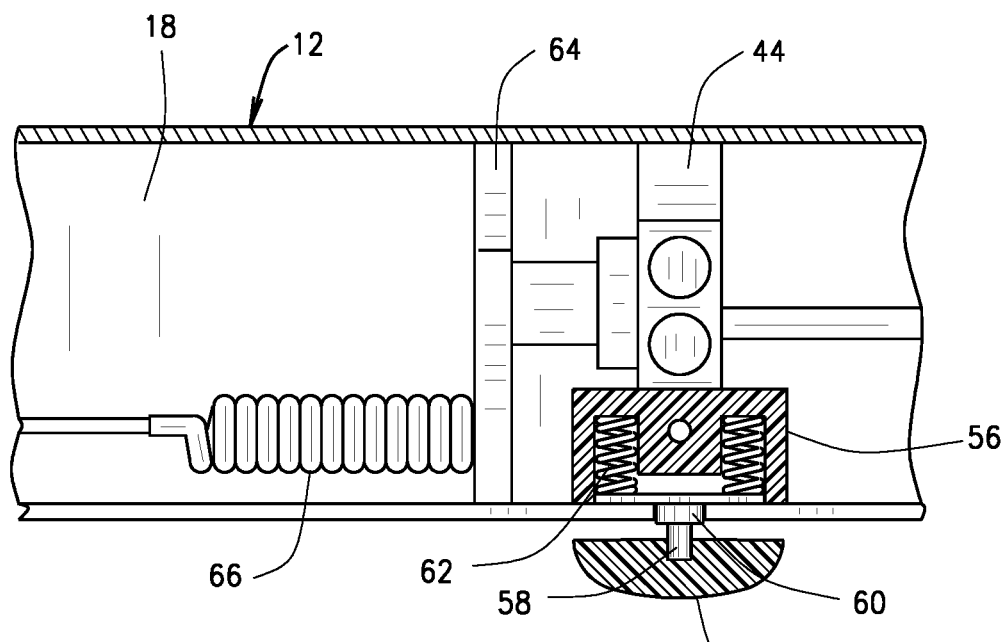
FIG. 10 is a further enlarged detail taken along the line of 10-10 in
FIG. 7.

First arm 12 has an elongated slot 48 in one of side flanges 20 with a first slot enlargement 50 at proximate end 16 and a second slot enlargement 52 at a distal end 28. Slide carrier 44 is attached to a slide control 54 for movement along elongated slot 48. As best seen in FIGS. 9 and 10, slide carrier 44 has a spring biased member 56 slidable along elongated slot 48 and when received in first slot enlargement 50 locks lance shaped temperature sensor 38 in retracted position. When received in second slot enlargement 52, spring biased member 56 locks lance shaped temperature sensor 38 in extended position. Slide control 54 acts as a compressor for releasing spring biased member 56 from first and second slot enlargements 50, 52. In the form illustrated, spring biased member 56 includes a pin 58 with a head 60 which slides along elongated slot 48 on the inside of first arm 12 and is received in slot enlargements 50, 52 under bias of a spring 62. Downward pressure on slide control 54 pushes head 60 out of the slot enlargements such that slide carrier 44 may be moved inside of first arm 12.

As shown in FIGS. 6-7 and 9-11, slide carrier 44 includes operational circuitry which may be in the form of a PCBA 64 (printed circuit board assembly) acting as a data processor configured to receive input temperature data from lance shaped temperature sensor 38. Circuitry 64 then generates output data which is sent through wiring 66 to an electronic display window 68 positioned on first arm 12 near proximal end 16 where it is displayed as a temperature reading. PCBA 64 and electronic display window 68 are in series with a battery 70 housed in first arm 12 under control of a switch 72 positioned close to electronic display window 68. In some embodiments, a toggle 74 may also be provided on first arm 12 such that a use may elect whether temperature is displayed in centigrade or fahrenheit.

A chart 76 is provided on the inside of second arm 14 on the proximate end 16 with doneness options such as well done, medium and rare for meats such as beef, pork and fish. It will be understood that circuitry 64 may provide this informed in digital display 68 and sent an alert when a desired temperature correlated with the desired doneness has been reached for the type of food being cooked.

In use, with first and second arms 12, 14 in an open position as shown tongs 10 may be used in a usual manner to manipulate a food item on a cooking surface such as barbecue grill. In a closed position and with lance shaped temperature sensor 38 extended as shown in FIG. 3, the lance may be inserted into the food item for taking a temperature which is displayed in electronic display window 68.

Cooking tongs 10 provide a number of ergonomic advantages over cooking equipment presently available. First the food handling and temperature taking functions are consolidated into a single tool for single handed use. Another important advantage is that the user's hand is spaced away from the cooking surface during the temperature taking operation. A still further benefit is that the electronic display window 68 is readily viewable to a user as seen when the temperature probe is inserted into a food item.

In the preceding description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure.

What is claimed is:

1. Cooking tongs comprising a first and second arm each of which has a proximal and a distal end and each of which is u-shaped with side flanges having inwardly turned ends, said first arm attached to a first spatula at the distal end and said second arm attached to a second spatula at the distal end, said first and second spatulas being generally flat and inwardly cupped, said first and second arms hinged at the proximal end with a torsion spring that is biased to hold the first and second arms in an open configuration, said torsion spring having a locking mechanism for selectively holding the first and second arms in a closed configuration, a lance shaped temperature sensor mounted inside the first arm on a slide carrier and an aperture in the first spatula through which a distal end of the lance shaped temperature sensor may be reciprocated, a slide control attached to the slide carrier that extends through a slot in a sidewall of the u-shaped first arm for telescopic sliding of the lance shaped temperature sensor through the aperture in the first spatula, an electronic display window on the first arm near the proximal end for an electronic display, said electronic display connected to a data processor mounted inside the first arm, said data processor connected to the lance shaped temperature sensor for converting a signal received from the lance shaped temperature sensor into temperature data that is displayed in the electronic display window.

2. The cooking tongs of claim 1 wherein a chart is provided on the inside of the second arm proximate the distal end, said chart providing doneness options for various meats.

3. Cooking tongs comprising first and second arms, each of which has a web with side flanges having interned ends, said first and second arms pivotably mounted to each other at a proximal end on a pivot pin through aligned openings in said side flanges with said second arm nested in the first arm at the proximal end, said web of the first and second arms merging into a food handling inwardly curved spatula at the distal end, said first arm having a digital display on an outer surface of the web adjacent the proximal end, a slide carrier movable in a channel formed between the web and the side flanges having interned ends, said slide carrier connected to a lance shaped temperature sensor for reciprocation in and out of an aperture provided in the spatula at a distal end of a slot wide enough that the lance shaped temperature sensor may pass, operational circuitry on the slide carrier configured to receive input data from the lance shaped temperature sensor, said operational circuitry generating output data associated with the input data and sending the output data to the digital display, said first arm having a elongated slot in one of the side flanges, said elongated slot having a slot enlargement at a proximal end and a slot enlargement at a distal end, said slide carrier having a spring biased member slidable along the slot on the inside of the first arm and received in said first slot enlargement for locking the sliding carrier in a first position with the lance shaped temperature sensor retracted from the aperture and which is received in said second slot enlargement for locking the sliding carrier in a second position with the lance shaped temperature sensor extended through the aperture, a slide control on the outside of the first arm for moving the slide carrier along the elongated slot and for unseating the spring biased member from either said first slot enlargement or second slot enlargement, said second arm having a chart on the inside of the web proximate the proximal end with doneness temperature options for different meats.

4. The cooking tongs of claim 3 wherein a guide is positioned on the web of the first arm between the slide carrier and the spatula for guiding the lance shaped temperature sensor through the aperture in the spatula.

5. The cooking tongs of claim 3 wherein the spring biased member includes a pin with a head biased with a spring into engagement with the elongated slot, said head when received in the first slot enlargement locking the lance shaped temperature sensor in retracted position and when received in the second slot enlargement locking the lance shaped temperature sensor in extended position.

6. The cooking tongs of claim 3 wherein the operational circuitry and the digital display are in circuit with a battery positioned in the first arm at the proximal end.

7. The cooking tongs of claim 6 wherein an on/off switch for the battery is positioned on the outside of the web of the first arm at the proximal end.

8. The cooking tongs of claim 3 wherein a toggle is provided on the outside of the web of the first arm at the proximal end, said toggle in series with the operation circuitry for controlling whether a temperature in the digital display is centigrade or fahrenheit.

* * * * *